(12) United States Patent
Waterstredt

(10) Patent No.: US 9,145,975 B2
(45) Date of Patent: Sep. 29, 2015

(54) SOLENOID WITH SPRING PLUG

(75) Inventor: Jeffrey J. Waterstredt, Royal Oak, MI (US)

(73) Assignee: BORGWARNER INC., Auburn Hills, MI (US)

( * ) Notice: Subject to any disclaimer, the term of this patent is extended or adjusted under 35 U.S.C. 154(b) by 287 days.

(21) Appl. No.: 13/520,244

(22) PCT Filed: Jan. 10, 2011

(86) PCT No.: PCT/US2011/020636
§ 371 (c)(1),
(2), (4) Date: Jul. 2, 2012

(87) PCT Pub. No.: WO2011/087973
PCT Pub. Date: Jul. 21, 2011

(65) Prior Publication Data
US 2013/0126768 A1 May 23, 2013

Related U.S. Application Data

(60) Provisional application No. 61/335,790, filed on Jan. 12, 2010.

(51) Int. Cl.
| F16K 31/06 | (2006.01) |
| F16F 1/12 | (2006.01) |
| F16K 31/02 | (2006.01) |
| G05D 16/20 | (2006.01) |

(52) U.S. Cl.
CPC .............. *F16K 31/02* (2013.01); *F16K 31/06* (2013.01); *G05D 16/2013* (2013.01); *F16F 1/121* (2013.01); *F16F 1/125* (2013.01)

(58) Field of Classification Search
CPC ............. F16F 1/12; F16F 1/121; F16F 1/041; F16F 1/125; B60G 2204/12422; Y10S 411/947; F16K 31/06
USPC ............. 251/129.15, 337; 267/177, 178, 179; 335/274
See application file for complete search history.

(56) References Cited

U.S. PATENT DOCUMENTS

| 273,695 | A | * | 3/1883 | Knobeloch | 267/177 |
| 1,587,116 | A | * | 6/1926 | Graves | 267/28 |
| 1,878,128 | A | * | 9/1932 | Griswold | 267/286 |
| 3,169,757 | A | * | 2/1965 | Roder et al. | 267/177 |
| 3,241,005 | A | * | 3/1966 | Morris, Jr. | 335/261 |
| 3,988,706 | A | | 10/1976 | Springer | |
| 4,838,954 | A | * | 6/1989 | Perach | 137/625.65 |
| 4,917,351 | A | * | 4/1990 | Lindbloom et al. | 251/129.18 |
| 4,947,893 | A | * | 8/1990 | Miller et al. | 137/625.65 |
| 5,110,087 | A | * | 5/1992 | Studtmann et al. | 251/129.16 |
| 5,240,227 | A | * | 8/1993 | Sich | 251/129.16 |

(Continued)

OTHER PUBLICATIONS

International Search Report for PCT/US2011/020636 (the PCT application from which the present application is filed).

*Primary Examiner* — Marina Tietjen
*Assistant Examiner* — Seth W Mackay-Smith
(74) *Attorney, Agent, or Firm* — Warn Partners, P.C.

(57) ABSTRACT

A solenoid valve is provided which includes a valve member, an armature for moving the valve member, an electro-magnetic coil for inducing movement of the armature. A coil spring is provided for engagement with the armature, the coil spring has at least a first end being generally cylindrical and a second end contacting the armature. A plug is provided threadably engaged with the spring first end along an adjustable length of the spring.

4 Claims, 1 Drawing Sheet

(56) References Cited

U.S. PATENT DOCUMENTS

| | | | |
|---|---|---|---|
| 5,284,317 A * | 2/1994 | Brehm et al. | 251/129.08 |
| 5,503,366 A * | 4/1996 | Zabeck et al. | 251/129.18 |
| 5,611,370 A | 3/1997 | Najmolhoda | |
| 5,707,039 A * | 1/1998 | Hamilton et al. | 251/129.17 |
| 5,722,645 A * | 3/1998 | Reitter | 267/177 |
| 6,029,703 A * | 2/2000 | Erickson et al. | 137/625.61 |
| 6,068,237 A | 5/2000 | Holmes et al. | |
| 6,223,761 B1 | 5/2001 | Najmolhoda et al. | |
| 6,225,886 B1 * | 5/2001 | Kleinert et al. | 335/257 |
| 6,471,197 B1 * | 10/2002 | Denk et al. | 267/175 |
| 7,219,875 B2 * | 5/2007 | Dayton | 251/129.15 |
| 7,578,494 B2 * | 8/2009 | Mitsumata et al. | 251/129.15 |
| 2009/0267009 A1 * | 10/2009 | Hofmann et al. | 251/129.15 |

* cited by examiner

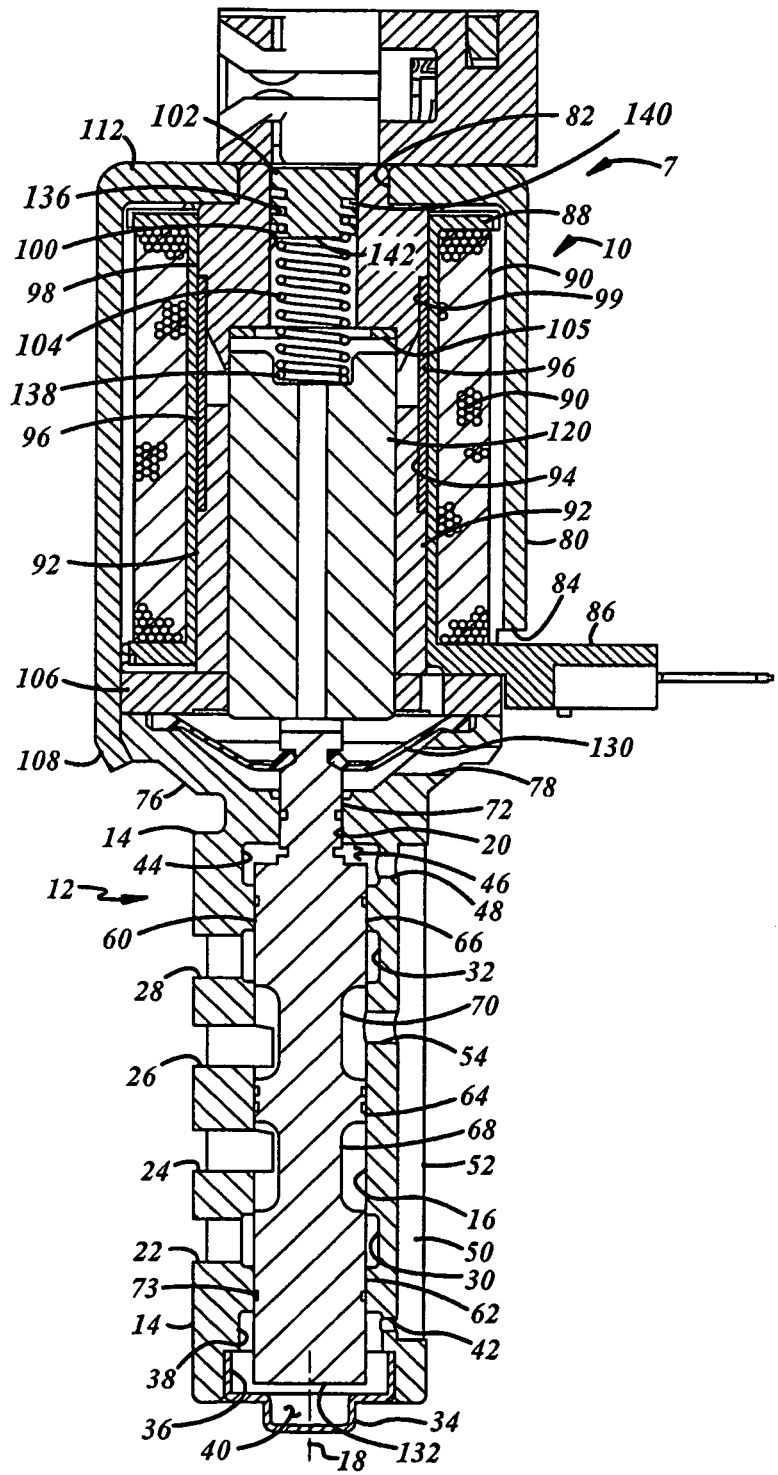

SOLENOID WITH SPRING PLUG

FIELD OF THE INVENTION

The present invention relates to solenoid valves, especially proportional solenoid valves and methods of adjustment thereof.

BACKGROUND OF THE INVENTION

When utilizing proportional hydraulic solenoid valves, especially when utilizing them in the environment of control of an automatic transmission, it is desirable that a spring rate of the compression spring, which positionally biases an armature of a control valve, be matched with the "spring rate" of the solenoid magnetic force such that the combination of the two spring rates cancel one another resulting in a uniform net force across a stroke range of a solenoid valve. The cancelling out of the spring rates provides a hydraulic solenoid valve design that regulates a control pressure independent of a supply pressure and temperature. The freedom of utilizing a solenoid valve as described above, in most applications is denied due to the manufacturing tolerances of the spring and the solenoid magnetic components. Matching of the spring rates is not precise enough to achieve the desired performance. It is desirable to provide an apparatus and a method supplying an ability to calibrate the rate of the compression spring.

Prior to the present invention, a compression spring load was often calibrated by pressing or screwing an adjustment component into another solenoid component to achieve a load upon the armature of the solenoid at a specific height. However, the adjustment components that adjusted the spring provided no means to adjust the rate of the compression spring. It is desirable to provide an apparatus and method of utilization thereof of adjusting the spring rate of a compression spring utilized in a proportional hydraulic control valve.

SUMMARY OF THE INVENTION

To make manifest the above noted and other desires, a revelation of the present invention is brought forth. In a preferred embodiment of the present invention, an adjustment plug is provided. The plug has a helical groove or thread. The groove is designed to have a pitch that closely matches that of the compression spring. The compression spring has at least one end that is left open (rather than "closed") such that it can be threaded onto the helix of the adjustment plug. By twisting more of the coils into the helix, the number of the active coils is reduced and thus the spring rate of the adjusted spring is lowered. The adjustment sub assembly consisting of the adjustment plug and compression spring can be measured and adjusted so that the spring rate is precisely set prior to incorporation into a solenoid assembly. Once the above noted subassembly is added to the solenoid assembly, the plug can be pressed into a solenoid component (in most cases a pole piece) until the desired load and related performance (in most cases a "zero amp pressure") is achieved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

The present invention will become more fully understood from the detailed description and the accompanying drawings, wherein.

BRIEF DESCRIPTION OF THE DRAWINGS

FIG. 1 is a sectional view of a preferred embodiment solenoid valve of the present invention;

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, a normally high version of a control valve 7 of the present invention is presented. The control valve 7 has a solenoid portion 10. The control valve 7 also has a hydraulic portion 12. The hydraulic portion 12 has a valve sleeve 14. The valve sleeve 14 can be fabricated from a number of suitable metals or polymeric materials, but in most instances, it is typically preferable to be fabricated from a die cast and machined aluminum. The valve sleeve 14 has a central spool bore 16: The spool bore 16 has a central axis 18 which is co-terminus with an axis of a stem bore 20. The valve stem 14 has a series of radial passages which intercept the spool bore 16. Passage 22 is connected with a control pressure passage in a valve housing (not shown) encircling the valve spool 14. The control pressure (Pc) is typically that of a clutch (not shown) in an automatic transmission. Radial inlet passage 24 via a housing passage (not shown) connects the spool bore 14 with a pressure supply source typically provided by a hydraulic pump (not shown). Passages 26 and 22 are juxtaposed by radial passage 24. Radial passage 26 is connected with the control pressure via a housing passage (not shown). Radial passage 26 typically acts as an inlet for control pressure. Radial passage 22 typically acts as an outlet for control pressure. Radial outlet passage 28 via a housing passage 9 (not shown) is typically utilized to connect a hydraulic exhaust or sump 13 with the spool bore 16. Adjacent to the control and exhaust pressure passages 22 and 28, the bore 16 has two annular enlargements 30 and 32.

Valve sleeve 14 at its extreme end has an axial opening which is plugged by a cap 34 which fits into an annular enlargement 36. The annular enlargement 36 connected with an annular enlargement 38. The annular enlargement 36, 38 along with the cap 34 form a lower feedback chamber 40. The annular enlargement 38 is radially intersected by a radial orifice 42. The ratio of the area of the orifice 42 to the volume of the feedback chamber 40 is small enough that the feedback chamber 40 provides a dampening function to movement of the valve spool 60.

Towards an upper end of the spool bore 16, the valve sleeve has an annular enlargement 44. The annular enlargement 44 forms an upper feedback chamber. The upper feedback chamber 46 has a radial orifice 48. The orifice 48 is typically larger than the orifice 42. The radial orifice 48 is fluidly connected with a longitudinal slot 50 that extends along an outer radial surface of the valve sleeve 14. Longitudinal slot 50 along its outer radial edge 52 contacts the housing 15. The longitudinal slot 50 fluidly connects the lower feedback chamber 40 with the upper feedback chamber 46. The longitudinal slot 50 is also fluidly connected with the valve spool bore 16 by a radial orifice 54.

Slidably mounted within the valve spool bore 16 is valve member or spool 60. Valve spool 60 has a lower landing 62, a middle landing 64 and an upper landing 66. Separating the landings 62 and 64 is a reduced diameter portion or shank 68. Separating the landings 66 and 64 is a shank 70 which is additionally exposed to the radial orifice 54. At the top of the spool 60 is a stem 72. The spool 60 also has a series of balancing annular grooves 73. The spool 60 in the configuration shown has a metered out configuration for supply pressure to control pressure and a metered out configuration for control pressure to exhaust. Movement of the valve spool 60 downward from the position shown in FIG. 1 causes fluid adjacent the spool shank 68 to be metered out from the supply pressure to the control pressure and thereafter exit the control pressure outlet passage 22. A top portion of the valve sleeve 14 spreads out into an annular yolk 76. The annular yolk 76 is intersected by a radial side bore 78. The solenoid portion 10 has a can or housing 80. The housing 80 has a central top aperture 82. The housing 80 is crimped to the yolk 76 of the valve sleeve and also has a side opening 84 to allow for a connection within an electrical connector 86. Positioned within the housing 80 is an annular bobbin 88. The bobbin 88 supports a coil bundle 90. Inside the bobbin 88 is a flux tube 92. The flux tube 92 along its upper portion has on its outer radial surface a longitudinal annular groove 94. Supported on the groove 94 by an interferance fit is an alignment tube 96. The alignment tube 96 is typically fabricated from a non-magnetic material like brass or stainless steel. The alignment tube positions an interference fitted pole piece 98. The pole piece 98 has an annular groove for acceptance of the alignment tube 96. The pole piece 98 has a central bore 100 that has its extreme end closed by a plug 102. The plug 102 acts as a retainer for a biasing spring 104. The biasing spring 104 positionally biases an armature 120 against the valve stem 72. Positioned under the flux tube 92 is a ferro-magnetic flux washer 106. When a housing peripheral portion 108 is crimped to the yolk 76 of the valve sleeve, the yolk 76 is in compression with the flux washer 106, flux tube 92, alignment tube 96, pole piece 98 and the top cover portion 112 of the housing. When the coil 90 is energized, the flux loop includes the pole piece 98, flux tube 92, and flux washer 106 and the housing 80.

The alignment tube 96 precisely locates the flux tube 92 to the pole piece 98. Slidably mounted within the flux tube 92 is an armature 120. The armature 120 outside diameter is plated or coated with a hard, low-friction, non-magnetic or semi-magnetic material such as nickel phosphorous or chrome in a thickness in approximately 50 micron. The plating or coating later serves a dual purpose of providing a hard, low friction bearing surface and maintaining a non-magnetic (or semi-magnetic) "air-gap". The plated or coated armature outside diameter slides directly on the flux tube 92 inside diameter. The clearance between the armature 120 OD and the flux tube 92 ID is minimized to thus minimize the relative eccentricity of the tube components. By minimizing the relative eccentricity, magnetic slide-loading is also minimized which in turn minimizes friction and hysteresis. At the same time the magnetic return gap is also held to a very small distance (equal to the layer thickness; approximately 50 micron) so that solenoid efficiency is maximized. A non-magnetic washer 105 prevents the armature 120 from "locking" with the pole piece 98.

A diaphragm 130 is located between the yolk 76 of the valve sleeve 14 and the solenoid portion 10 to prevent contaminated oil, typically found in automatic transmission fluid, from being transferred into the solenoid portion 10. Typically the diaphragm 130 will be shaped such that volume displacement in the solenoid portion of the solenoid valve 7 will be minimized regardless of the position of the valve spool 60.

As mentioned previously, the solenoid valve 7 is biased to be normally high. Therefore, in most situations, the spring 104 positions the armature 120 to position the valve spool 60 so that oil surrounding the annular groove 68 of the valve spool is being metered out from the supply inlet passage 24 to the control pressure outlet 22. In a normal position, fluid exiting orifice 54 travels through slot 50 and then through orifice 42 to pressurize the feedback chamber 40. The feedback chamber 40 acts against the full cross-sectional surface area of the valve spool along the surface 132 which is greater than the surface acted upon within the upper feedback chamber 46 due to the diameter of the stem 20. Accordingly, there is upward biasing force acting upon the spool 60 which keeps the spool 60 in contact with the armature 120. In an embodiment (not shown) the biasing force can be supplemented by a spring positioned within the chamber 40 pushing against the valve spool 60. To reverse the position of the valve, the solenoid coil 90 is energized causing the armature 120 to be attracted against the force of the biasing of spring 104 to be attracted to the pole piece 98 thereby causing the fluid about the reduced diameter portion 70 to be metered out to the exhaust 28 when the fluid from the control pressure inlet 26 is connected therewith. When the fluid is flowing to the exhaust, the transient flow factors act upon the valve spool 60 in a direction to close, thus having a stability effect.

By using two feedback chambers 40 and 46 that act opposite of one another, the total volume of oil that is pumped in and out of the feedback chambers 40 and 46 is maximized. The larger feedback chamber 46 has an orifice 42 sized to balance damping for stability and cold response of the spool valve 60. The size of orifice 42 can be customized for a given clutch or transmission.

The spring 104 has a first end 136. The end 136 is generally cylindrical and is open. A second bottom end 138 of the spring 138 engagingly contacts the armature 120 to positionally bias the armature 120 against the valve spool 60. The plug 102 on an outer diameter has a helical groove or thread 140. The groove 140 is designed to have a pitch that closely matches that of the spring 104. Accordingly, a bottom end 142 of the plug can be threaded into the first end 136 of the spring. By twisting more of the coils of spring 104 upon the plug 102, the number of active coils is reduced with infinite variation within a specific range and thus, the spring rate is lowered. A subassembly of the plug 102 and spring 104 can be measured and adjusted so that the spring rate for the spring 104 is precisely set prior to assembling into the solenoid assembly through the central bore 100 of the pole piece 98.

The plug 102 can be a polymeric or metal material or other suitable alternative. The axial location of the plug 102 within the central bore 100 of the pole piece also serves to set the preload of the spring 104 upon the armature 120. The plug 102 is typically press fitted within the central bore 100 to set the aforementioned preload of the spring 104 upon the armature 120. Additionally, since the plug 102 is deformable, its deformation properties can be utilized to deform about or crimp in place the spring 104 with respect to the plug 102 to prevent the spring from rotating over its operational life and therefore modifying the final adjusted spring rate by changing the amount of active coils that are in the spring. The crimping function can be accomplished as a result of the press fitting operation. It is desirable that the preload upon spring 104 and the setting of the spring load of the spring 104 be such that a specific "zero amp pressure state" is achieved. In the embodiment shown the solenoid valve is a normally "high pressure or on" type solenoid valve, however the present invention can be utilized in a normally "low pressure or off" type solenoid valve application.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of calibrating a proportional solenoid valve having a valve member moved by an armature which is positionally biased by a spring having first and second ends with said spring first end being generally cylindrical and said spring second end engaging said armature, said adjusting method comprising:

threadably engaging an interior of said spring first end with a deformable plug having helical grooves on an outer diameter to set a spring rate of said spring by infinitely variably adjusting within a specific range the number of active coils in said spring to adjust the spring rate of said spring in relationship to a spring rate of a magnetic coil of said solenoid such that a spring rate of said spring and said spring rate of said magnetic coil cancel out each other resulting in a more uniform net force across a stroke range of said solenoid valve;

inserting said spring into a central bore of a pole piece of said solenoid valve; and deforming said plug to resist rotation relative to said spring after the final adjustment of active coils is completed by press fitting said plug in said central bore of said pole piece and preloading of said spring on said armature.

2. A proportional solenoid valve calibrated according to the method of claim 1.

3. A proportional solenoid valve as described in claim 2 wherein said plug is a metal.

4. A proportional solenoid valve as described in claim 2 wherein said plug is a polymeric material.

* * * * *